[12] United States Patent  
Petty et al.

(10) Patent No.: US 7,827,229 B2  
(45) Date of Patent: Nov. 2, 2010

(54) SYSTEM AND METHOD FOR DOCUMENT IMAGING MANAGEMENT

(75) Inventors: Jeremy Petty, Garland, TX (US); Lane Segerstrom, McKinney, TX (US)

(73) Assignee: Sanford, L.P., Oak Brook, IL (US)

( * ) Notice: Subject to any disclaimer, the term of this patent is extended or adjusted under 35 U.S.C. 154(b) by 1399 days.

(21) Appl. No.: 11/066,868

(22) Filed: Feb. 24, 2005

(65) Prior Publication Data

US 2006/0190400 A1    Aug. 24, 2006

(51) Int. Cl.  
    *G06F 15/16* (2006.01)
(52) U.S. Cl. .................. 709/201; 709/202
(58) Field of Classification Search ........... 709/201, 709/202  
See application file for complete search history.

(56) References Cited

U.S. PATENT DOCUMENTS

| 6,192,165 | B1* | 2/2001 | Irons | 382/306 |
| 6,545,769 | B2* | 4/2003 | Collard et al. | 358/1.16 |
| 6,744,936 | B2* | 6/2004 | Irons et al. | 382/306 |
| 6,885,481 | B1* | 4/2005 | Dawe | 358/505 |
| 7,003,529 | B2* | 2/2006 | Lusen et al. | 707/104.1 |
| 7,216,070 | B2* | 5/2007 | Kitada et al. | 703/6 |
| 2005/0067482 | A1* | 3/2005 | Wu et al. | 235/375 |
| 2006/0168148 | A1* | 7/2006 | Hyakutake et al. | 709/219 |

* cited by examiner

*Primary Examiner*—Shawki S Ismail  
(74) *Attorney, Agent, or Firm*—Marshall, Gerstein & Borun LLP

(57) ABSTRACT

The present disclosure provides a system and method for providing an improved system and method for document imaging management.

5 Claims, 8 Drawing Sheets

SYSTEM AND METHOD FOR DOCUMENT IMAGING MANAGEMENT

CROSS REFERENCE TO RELATED APPLICATION

This application is not related to any pending application.

BACKGROUND OF THE INVENTION

The present invention relates generally to document management and, more particularly, to a method and system for management of document images.

There are several document management systems available, but none of the available systems efficiently manage document imaging.

Therefore, what is needed, is a system and method that provides an improved system and method for document imaging management.

SUMMARY OF THE INVENTION

The present disclosure provides a system and method that provides an improved system and method for document imaging management.

BRIEF DESCRIPTION OF DRAWINGS

The foregoing summary as well as the following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which:

FIGS. 1-5 are example dialog boxes used in the present invention;

DETAILED DESCRIPTION OF THE PREFERRED EMBODIMENTS

The present disclosure can be described by the embodiments given below. It is understood, however, that the embodiments below are not necessarily limitations to the present disclosure, but are used to describe a typical implementation of the invention.

Example dialogs are described through FIGS. 1-5 and in general terms, but then later illustrated in greater detail through FIGS. 6-8 and the associated description.

Figure 1:
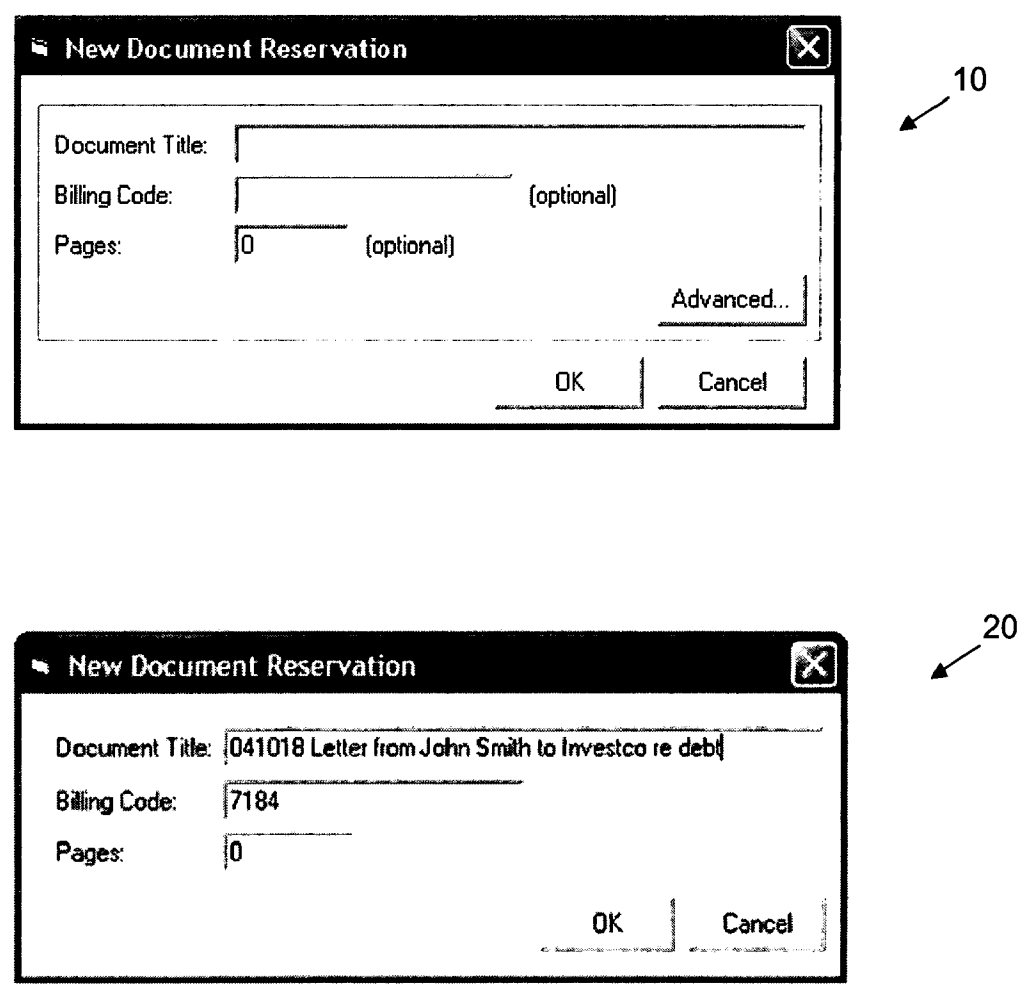

FIG. 1 illustrates a blank reservation creation form 10 that is to be used by a user to create a reservation for a location of a later to be scanned image. Another reservation creation form 20 is illustrated with example text listing a title, a billing code and an amount of pages.

Figure 2:
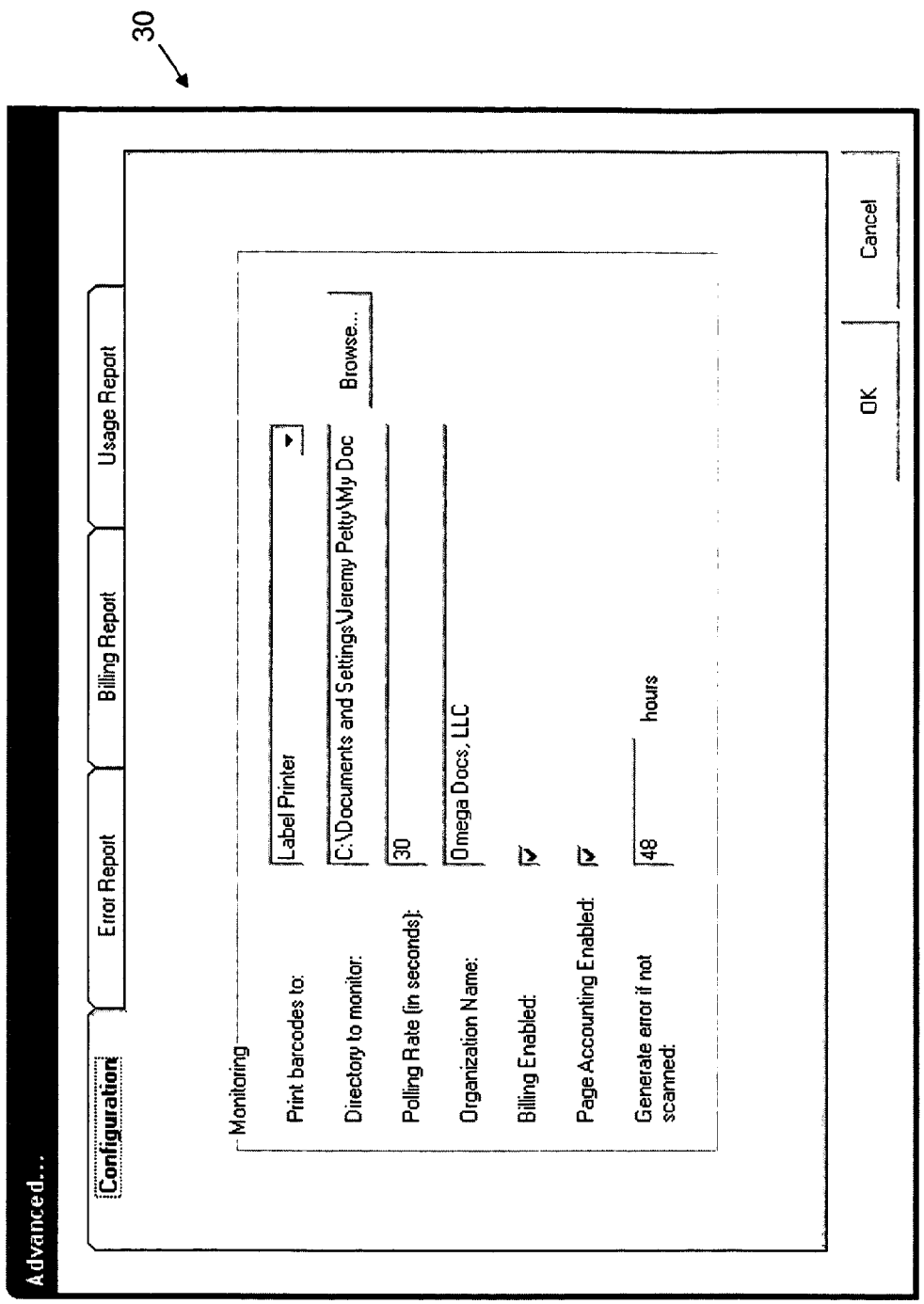
Figure 3:
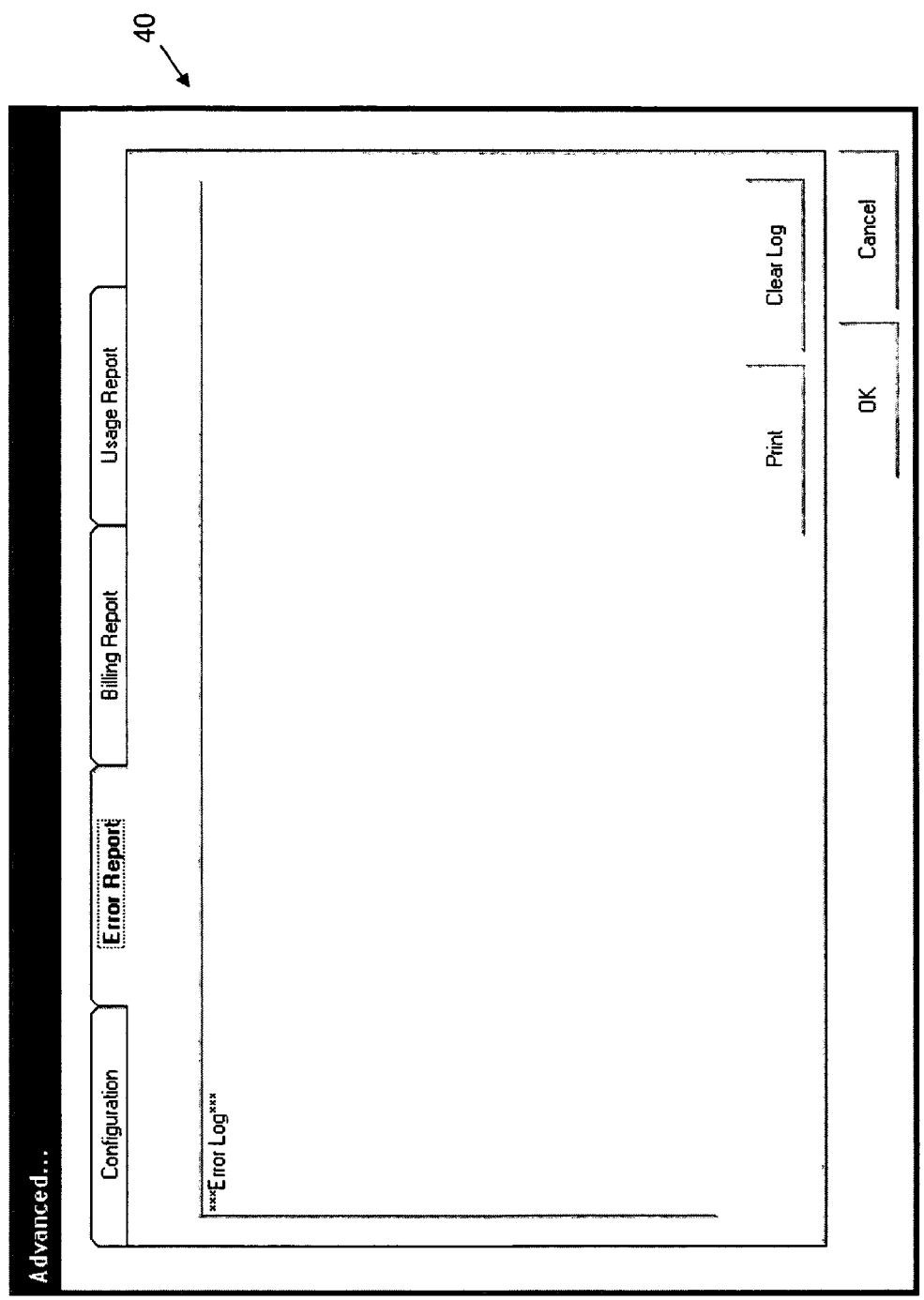
Figure 4:
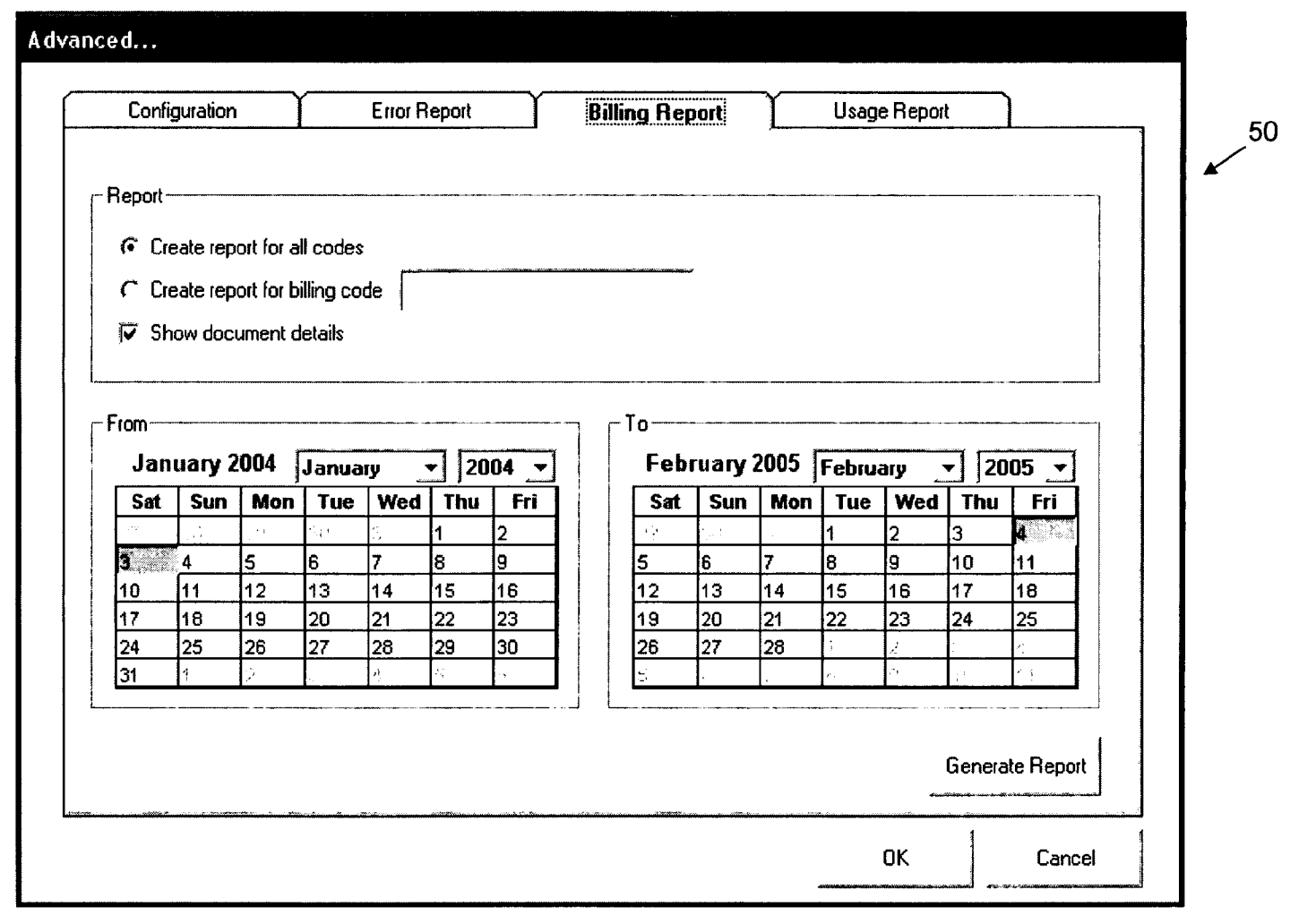
Figure 5:
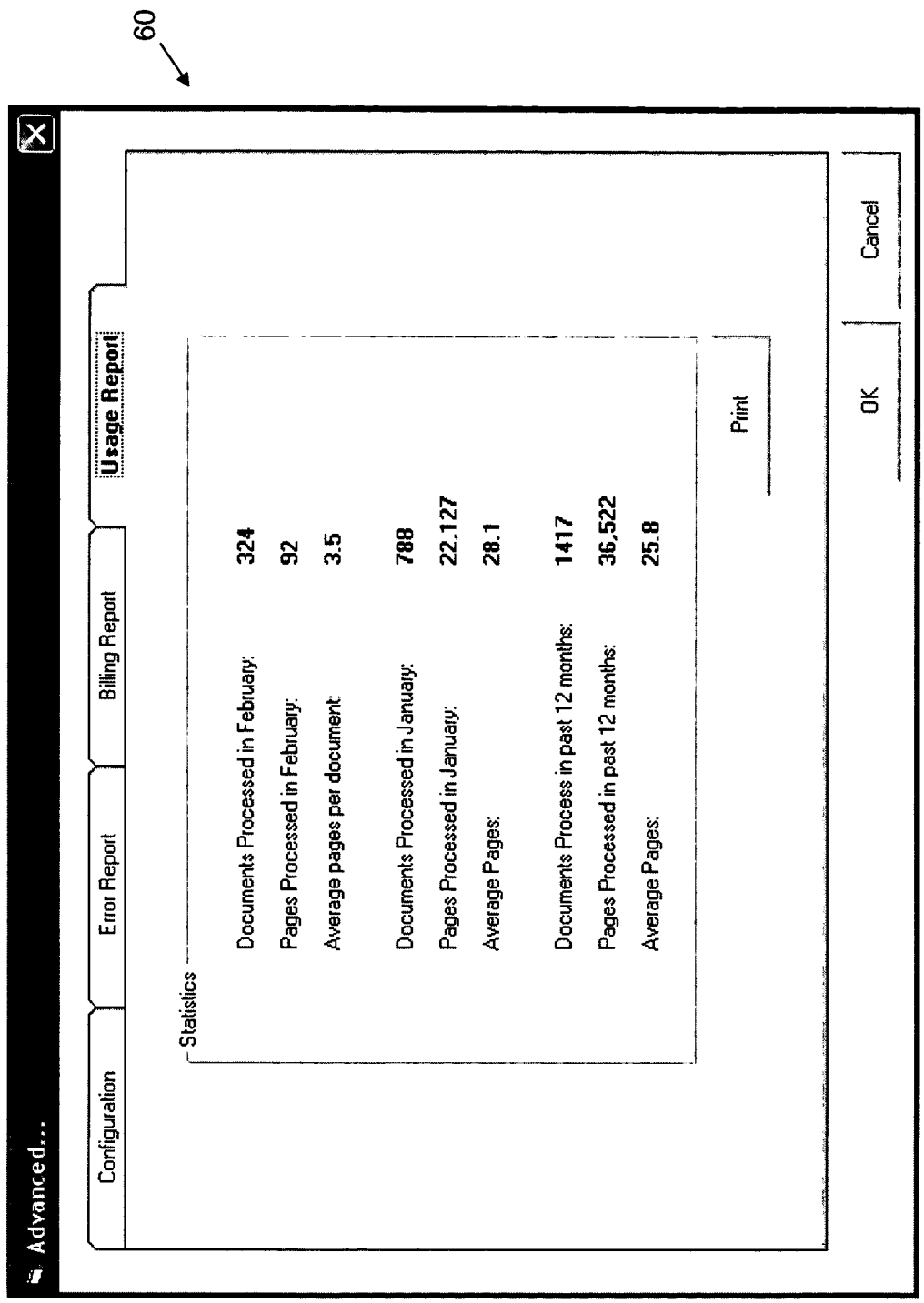
Figure 6:
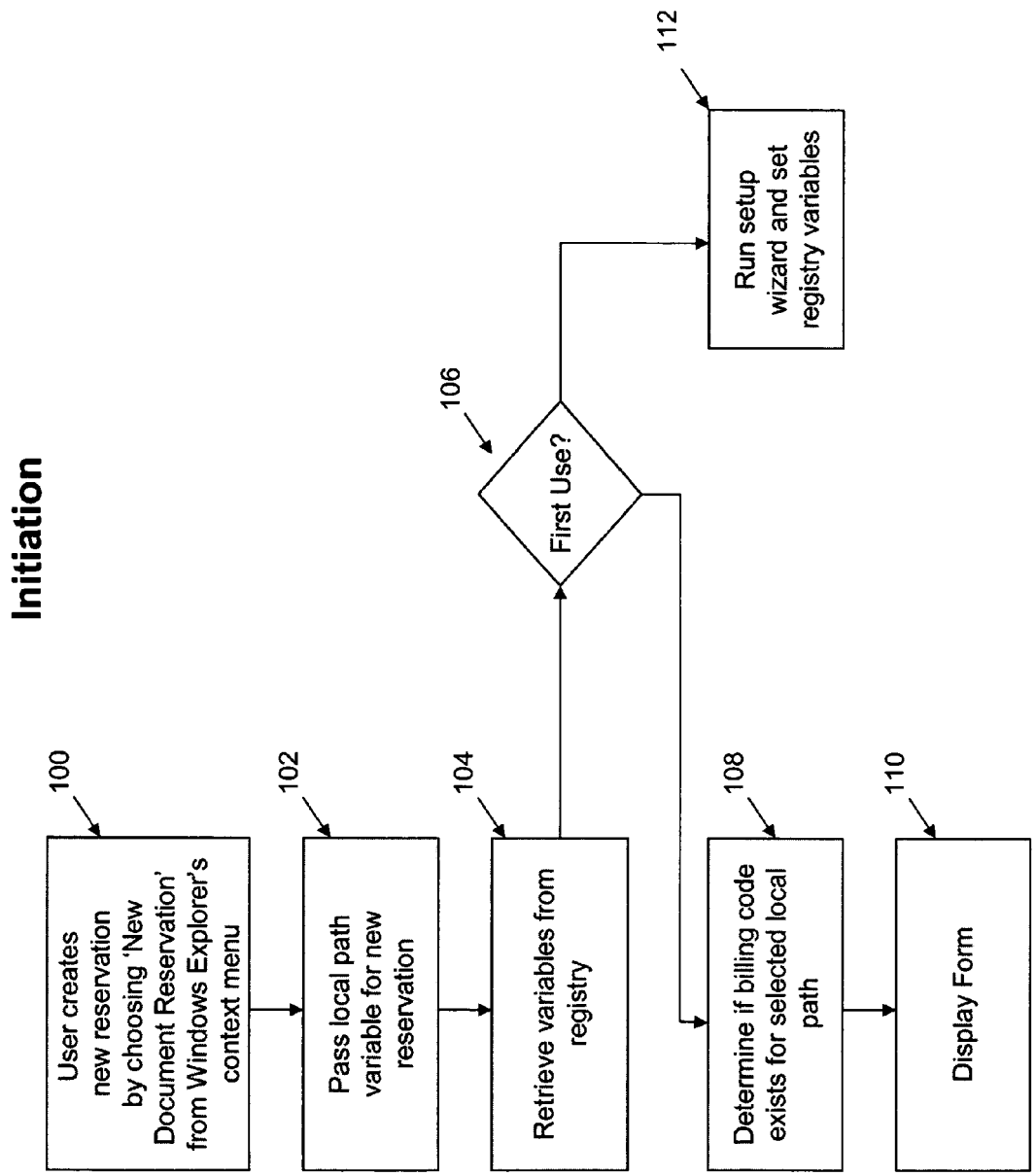
FIG. 6 is a chart of an initiation process of the invention.

FIGS. 2-5 illustrate a few options within the invention. FIG. 2 is an example configuration dialog 30, while FIG. 3 is an example error report 40. In addition, FIG. 4 is an example billing report dialog 50. Moreover, FIG. 5 is an example of a usage report dialog 60.

In order to illustrate greater detail of the invention, the system of the invention is now described through a number of flow diagrams. The system includes a monitor process and a client process. The monitor process and the client process are loaded on a client computer. Now referring to FIG. 6, a user first creates a new document reservation as indicated in module 100. The client process then passes a local path variable as shown in module 102. The client process then retrieves variables stored in the Microsoft Windows Registry as shown in module 104. The client process then checks to see if this is the first time the process has been used 106. If the client process has been configured, the system then proceeds to module 108 and determines if a billing code exists for the path variable. If the client process has not been configured, the system then proceeds to module 112 and allows the user to configure the client process. Now turning back to module 108, the software displays a form.

Figure 7:
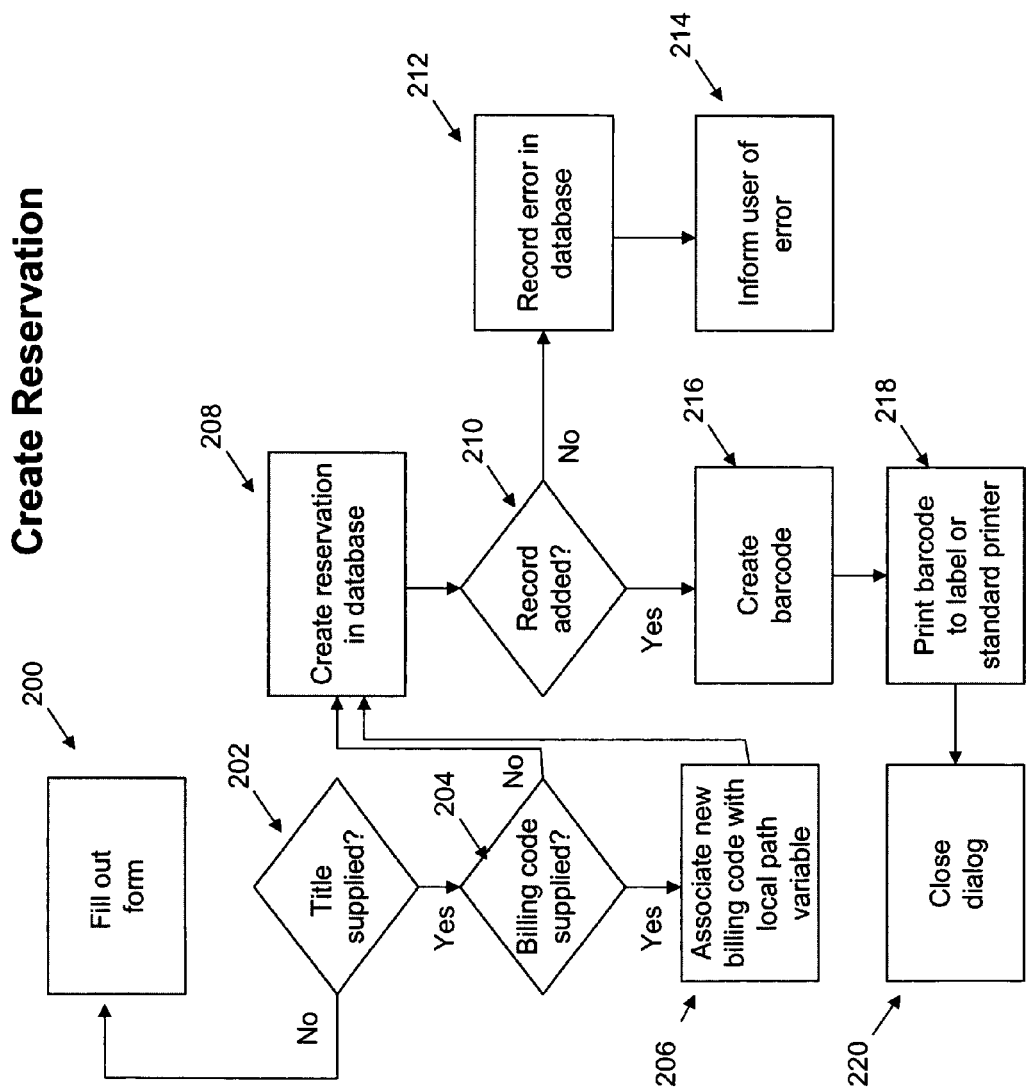
FIG. 7 is a chart of a reservation creation for the present invention.

FIG. 7 illustrates a flow for creating a reservation. The client process first starts by the User filling out a reservation form as shown in module 200. The client process then checks to see if a title was supplied as shown in module 202. If a title was not supplied, the client process then goes back to module 200 for the User to fill out the title. If the title was supplied, the client process then proceeds to check if a billing code that the User entered earlier is new as shown in module 204. If the billing code is new, the client process associates the billing code with the local path variable as shown in module 206 and proceeds to create a new reservation record in the reservation database as shown in module 208. If the billing code is not new, the client process then proceeds to create a new reservation record in the reservation database as shown in module 208. The client process then checks to see if a record was created in the database as shown in module 210. If a record was not created, the client process records the error in the database as shown in module 212 and informs the user of the error as shown in module 214. If a record was created, the client process then proceeds to create a barcode as shown in module 216. The client process then prints a label or document cover sheet with the barcode as shown in module 218, and then proceeds to close the dialog as shown in module 220.

Figure 8:
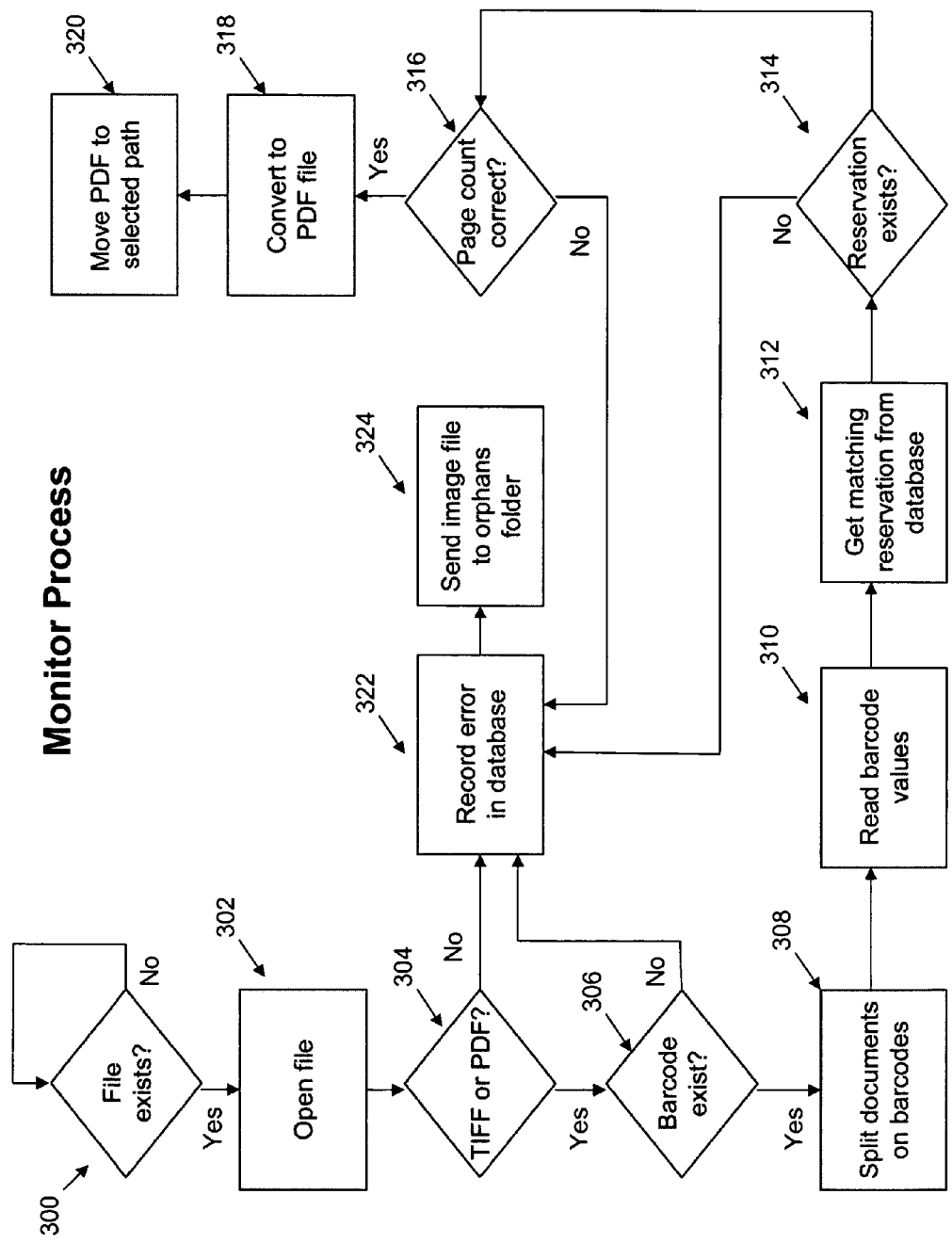
FIG. 8 is a chart of a monitoring process for the present invention.

Now turning to FIG. 8, the monitor process first determines if a file exists as indicated in module 300. If the file does not exist, the monitor process periodically checks until it finds one. Once a file is found, the monitor process then proceeds to open the file as shown in module 302. The process then checks to see if it's a TIFF or PDF image file as shown in module 304. If the file is a valid format, then the process proceeds to check if a barcode exists for the file as shown in module 306. If a barcode exists, the process then proceeds to split the image file into separate documents at each barcode as shown in module 308. The barcode value is read as shown in module 310. The process then proceeds to query the reservation database and find the record for the associated barcode as shown in module 312. The process then checks to see if a reservation exists for the barcode value as shown in module 314. The process then proceeds to generate a PDF file as shown in module 312. The process then determines if the page count created in the reservation matches the actual pages of the image file as shown in 316. If the page count is correct, the image file is converted to PDF as shown in module 318. The process then moves the file to the client computer using the reservation's path variable as shown in module 320. If the page count is incorrect, the process creates a record in the error database as shown in module 322, and sends the image file to the orphans folder as shown in module 324. If no reservation exists for a barcode, the process creates a record in the error database as shown in module 322, and sends the image file to the orphans folder as shown in module 324. If no barcode exists, the process creates a record in the error database as shown in module 322, and sends the image file to the orphans folder as shown in module 324. If the file is not a valid TIFF or PDF, the process creates a record in the error database as shown in module 322, and sends the image file to the orphans folder as shown in module 324.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A document management system, the system comprising:
   an interface to accept a document title;
   an interface to accept a billing classification number;
   an interface to accept a page count number;
   a reporting interface;
   a billing interface;
   an error report interface;
   a configuration interface;
   a document location associated with the title, billing classification number, and page count number prior to imaging a document, wherein the document location comprises a path variable specifying the location where the scanned image of the imaged document will be stored on a computer readable medium;
   an imaging device that images the document;
   a transfer device that transfers the scanned image to the document location on the computer readable medium; and
   an index that stores the document location along with the title, matter classification number, and page count number.

2. The system of claim 1 wherein the reporting interface is configured to manage and print reports.

3. The system of claim 1 wherein the billing interface is configured to manage and print billing reports.

4. The system of claim 1 wherein the error report interface is configured to manage and print error reports.

5. The system of claim 1 wherein the configuration interface is configured to manage configuration settings.

* * * * *